United States Patent
Klinghult

(10) Patent No.: US 7,839,051 B2
(45) Date of Patent: Nov. 23, 2010

(54) PROTECTION DEVICE

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 229 days.

(21) Appl. No.: 12/126,221

(22) Filed: May 23, 2008

(65) Prior Publication Data

US 2009/0289523 A1 Nov. 26, 2009

(51) Int. Cl.
*H02N 2/00* (2006.01)
*H01L 41/09* (2006.01)

(52) U.S. Cl. .................. 310/317; 310/318; 310/338

(58) Field of Classification Search ............ 310/318, 310/319, 338
See application file for complete search history.

(56) References Cited

U.S. PATENT DOCUMENTS

| 4,453,141 | A * | 6/1984 | Rosati ................ 331/158 |
| 5,032,753 | A * | 7/1991 | Yamaguchi et al. ...... 310/317 |
| 6,700,314 | B2 * | 3/2004 | Cuhat et al. ............ 310/334 |
| 6,876,135 | B2 * | 4/2005 | Pelrine et al. .......... 310/339 |
| 7,293,836 | B2 * | 11/2007 | Browne et al. ........ 297/344.11 |
| 2006/0208169 | A1 * | 9/2006 | Breed et al. ............ 250/221 |
| 2007/0106483 | A1 | 5/2007 | Kelley et al. |
| 2007/0107068 | A1 | 5/2007 | Kelley et al. |
| 2007/0214864 | A1 * | 9/2007 | Proksch ................. 73/1.79 |
| 2007/0253091 | A1 | 11/2007 | Jeansonne et al. |

OTHER PUBLICATIONS

"ElectroActive Polymers-EAPs", Azom.com—the A to Z of Materials, http://www.azom.com/details.asp?ArticleID=885, Apr. 25, 2008 (Print Date), 6 pages.
"Accelerometer", Wikipedia, http://en.wikipedia.org/wiki/Accelerometer, Apr. 25, 2008 (Print Date), 4 pages.
Steven Ashley, "Artificial Muscles", Scientific American, Inc., Oct. 2003, pp. 52-59.
"LIS331DL: MEMS motion sensor, 3-axis—±2g/±8g smart digital output 'piccolo' accelerometer", Jun. 11, 2007, Rev. 0.2, 33 pages.
"Micromuscle® EAP Technology", Micromuscle AB, http://www.micromuscle.com/technology/micromuscle, May 23, 2008 (Print Date), 1 page.
PCT International Search Report corresponding to PCT/EP2008/009736, mailed Mar. 5, 2009, 5 pages.

* cited by examiner

*Primary Examiner*—Thomas M Dougherty
(74) *Attorney, Agent, or Firm*—Harrity & Harrity, LLP

(57) ABSTRACT

In an embodiment, a device is provided comprising an accelerometer and an electroactive material. A control circuit is coupled between the accelerometer and the electroactive material.

7 Claims, 2 Drawing Sheets

PROTECTION DEVICE

FIELD OF THE INVENTION

The present invention relates to protection devices and apparatuses comprising such protection devices.

BACKGROUND

Many devices, for example portable devices, comprise movable parts. For example, a camera may comprise a lens arrangement with lenses movable for zooming or focusing, a cell phone may comprise a removable SIM card, battery or memory card, and a hard disk drive comprises a movable disk head to read data from a rotating disk. Other apparatuses may comprise other movable parts.

When such an apparatus is for example subjected to shocks or dropped to the floor, such movable parts are susceptible to be damaged, cause damage or at least cause inconveniences. For example, a disk head of a hard disk drive may crash into a rotating disk of the hard disk drive thus destroying data, lenses in a camera may be damaged, a battery, SIM card or memory card in a cell phone may be slightly loosened such that electrical contacts are interrupted etc.

Therefore, there is a need for devices to prevent or reduce the risk of such damages and inconveniences.

SUMMARY OF THE INVENTION

According to an embodiment, a device is provided, comprising: an accelerometer, an electroactive material, and a control circuit coupled between said accelerometer and said electroactive material.

Said electroactive material for example may comprise an electroactive polymer.

Said electroactive material in an embodiment may be arranged in at least one piece of electroactive material.

Said control circuit in an embodiment may be configured to activate said electroactive material in case a measurement of said accelerometer indicates a dangerous situation.

Said dangerous situation may for example comprise one or more situations taken from the group comprising a falling motion and an acceleration exceeding a predetermined threshold.

According to another embodiment, an apparatus is provided comprising: a movable part, at least one piece of electroactive material, said at least one piece of electroactive material being arranged and configured to assume a first state reducing possible movement of said movable part or a second state allowing movement of said movable part, an accelerometer, and a control circuit coupled between said accelerometer and said at least one piece of electroactive material, said control circuit being configured to control said at least one piece of electroactive material to assume said first state or said second state depending on a signal received from said accelerometer.

Said electroactive material for example may comprise an electroactive polymer.

Said control circuit in an embodiment may be configured to activate said electroactive material in case a measurement of said accelerometer indicates a dangerous situation.

Said dangerous situation for example may comprise one or more situations taken from the group comprising a falling motion and an acceleration exceeding a predetermined threshold.

Said apparatus may be chosen from the group comprising a camera, a hard disk, a computer and a cell phone, but is not limited thereto.

Said movable part may be chosen from the group comprising a chip card, a SIM card, a memory card, a battery, a hard disk read head and a lens arrangement, but is not limited thereto.

The apparatus in an embodiment may comprise a plurality of movable parts comprising said movable part, each of said plurality of said movable parts being associated with at least one piece of electroactive material.

According to a further embodiment, an electroactive polymer is used to selectively restrict movement of a movable part of an apparatus.

The above-mentioned features and embodiments may be combined with each other in any desired manner unless specifically noted to the contrary.

DETAILED DESCRIPTION OF THE INVENTION

Figure 1:
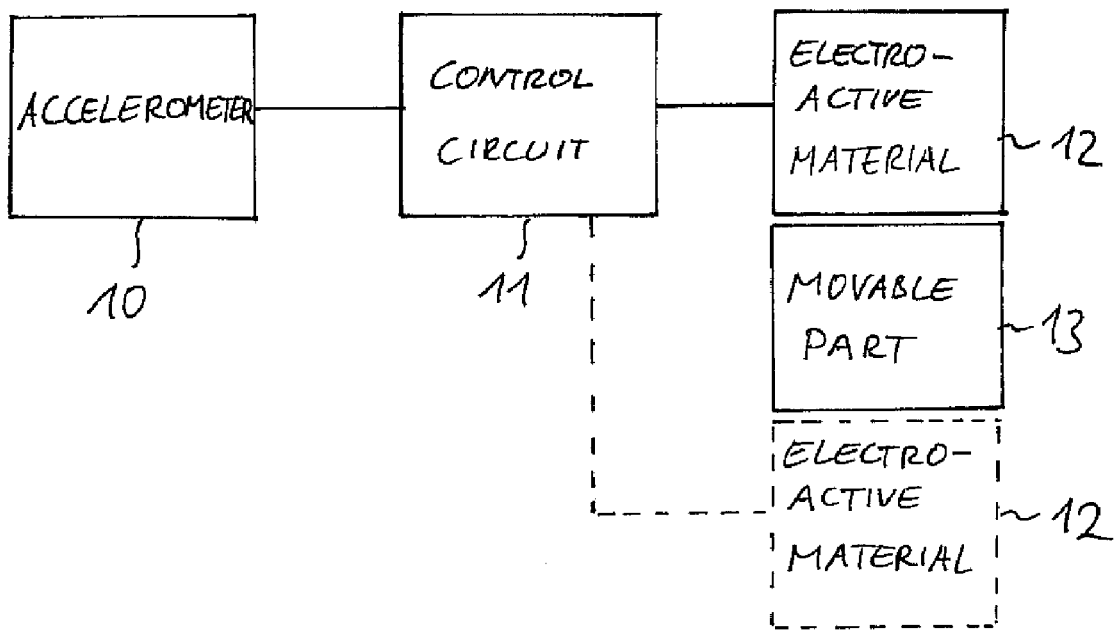
FIG. 1 shows a block diagram of a device according to an embodiment of the present invention, FIG. 2 schematically shows a lens arrangement according to an embodiment of the present invention.

In the following, embodiments of the present invention will be described in detail with reference to the attached drawings. It is to be noted that the embodiments described hereinafter are merely intended to illustrate the present invention and are not to be construed as limiting the scope thereof. For example, embodiments described hereinafter may comprise different elements which in other embodiments may be substituted by further elements or left out entirely. The drawings have been prepared to convey an illustration of some features of embodiments and are not to be regarded as exact technical drawings. In particular, different elements of the drawings are not necessarily to scale with each other, and the arrangement of elements has been chosen to increase legibility and is not to be construed to necessarily coincide with an actual arrangement in an actual implementation. Any directional terminology used herein with respect to the drawings, like "left", "right", "top", "bottom", "up" or "down" is merely intended to assist in referring to the drawings and is not to be construed as limiting the present invention to any particular orientation or arrangement of elements. Therefore, the embodiments described hereinafter and the attached drawings are not to be construed as limitative, and the scope of the present invention is intended to be defined only by the appended claims and equivalents thereof.

Before actual embodiments will be described, some technical terms used in the following description will be explained.

An accelerometer generally is a device for measuring acceleration and/or gravity induced reaction forces. The term may refer both to a single axis accelerometer measuring acceleration induced forces in only one direction or to a multi-axis accelerometer measuring acceleration as a vector quantity in two or three dimensions. Accelerometers generally can be used to sense inclination, vibration and/or shock. In a non-moving state, an accelerometer may for example measure the direction of gravity. This effect is for example conventionally used in cameras or equipment comprising a camera like cell phones to discriminate between portrait and landscape pictures taken.

The term electroactive material generally relates to a material which changes its shape in response to an applied voltage. Such electroactive materials include piezoelectric crystals, piezoelectric ceramic materials or electroactive polymers (EAPs). Electroactive polymers generally respond to external electrical simulation, for example an applied voltage, by displaying a significant shape or size displacement. Two major categories of electroactive polymers are electronic and ionic electroactive polymers which have different activation mechanisms. Several sub-classes to the above categories exist, like ferroelectric polymers, dielectric electroactive polymers, liquid elastomere materials, just to name a few electric electroactive polymers, or ionic polymer gel or carbon nano tubes just to name a few examples for ionic electroactive polymers.

Turning now to FIG. 1, an embodiment of a protection device for protecting a movable part 13 will be described. Movable part 13 may be a movable part susceptible to be damaged or to cause damage or inconveniences in any apparatus. For example, movable part 13 may be a battery, a SIM card or a memory card in a cell phone or other portable device, a disk head of a hard disk drive, or a movable lens system of a camera.

The protection device of FIG. 1 comprises an accelerometer 10, a control circuit 11 coupled to the accelerometer 10 and one or more pieces 12 of electroactive material arranged adjacent to movable part 13. Generally, in the protection device of the embodiment of FIG. 1, accelerometer 10 senses acceleration induced forces and transmits corresponding signals to control circuit 11. Control circuit 11 evaluates the signals and, if the signals indicate a dangerous situation which may cause damage to movable part 13 and/or which may lead to movable part 13 damaging other components of an apparatus, control circuit 11 controls the one or more masses or pieces 12 of electroactive material to increase their size to prevent or reduce movement of movable part 13.

For example, accelerometer 10 may sense gravity. If accelerometer 10 is not moving or moving essentially perpendicular to the direction of gravity, for example when carried by a person, accelerometer 10 senses the gravitational acceleration of the order of 9.8 m/s$^2$. If an apparatus incorporating the protection device of FIG. 1 is dropped, the gravitational acceleration sensed by accelerometer 10 in an embodiment drops to a small value at or near zero corresponding to a free fall. Such a rapid drop of the gravitational acceleration is taken by control circuit 11 to indicate a free fall corresponding to a potentially adverse situation such that in this case control circuit 11 controls the one or more pieces 12 of electroactive material to increase these in size to block movement of movable part 13. In another embodiment, additionally or alternatively control circuit 11 may detect a dangerous situation when an acceleration measured by accelerometer 10 exceeds a threshold value. For example, for the output values of accelerometer 10 a range may be defined as normal range corresponding to the values occurring during normal use of an apparatus incorporating the device of FIG. 11. When the values leave this normal range, a dangerous situation is detected by control circuit 11 and the one or more pieces 12 of electroactive material are controlled accordingly.

In an embodiment, the pieces 12 of electroactive material may be made of or comprise an electroactive polymer as described above.

It should be noted that while in FIG. 1 accelerometer 10 and control circuit 11 are depicted as separate parts, control circuit 11 may be integrated completely or partially with accelerometer 10. In another embodiment, control circuit 11 may be a separate part. In still another embodiment, any logic circuitry like a processor of an apparatus where the device of FIG. 1 is incorporated may be used as control circuit 11. For example, in case of a cell phone, a processor generally managing the operation of the cell phone may be used as control circuit 11.

In the following, some examples of applications of a protection device like the device of the embodiment of FIG. 1 in apparatuses according to embodiments of the present invention will be discussed with reference to FIGS. 2-4.

Figure 2:
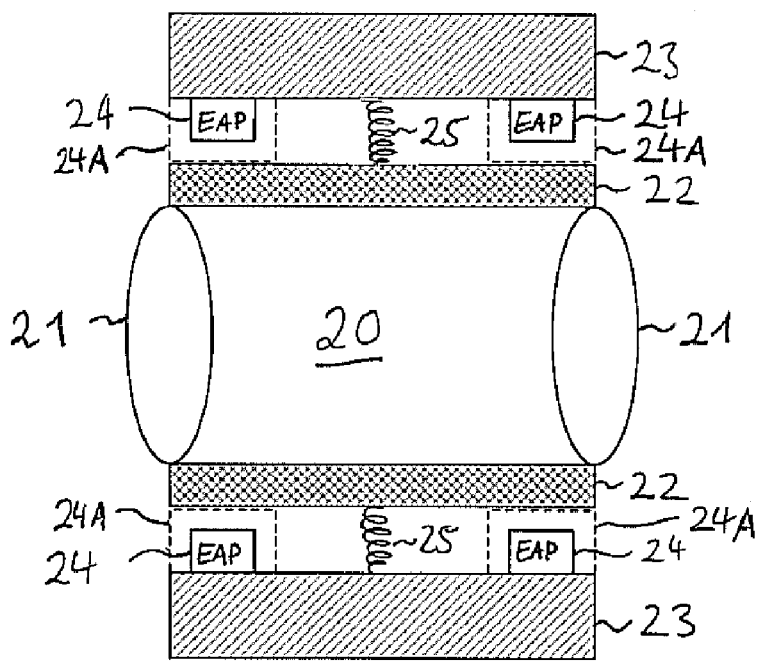

In FIG. 2, a lens arrangement according to an embodiment is shown. The lens arrangement of the embodiment of FIG. 2 may be incorporated for example in a camera, a cell phone, a portable computer or any other device requiring a lens arrangement. The lens arrangement comprises a lens system 20 of which two lenses 21 are shown in FIG. 2. However, it is to be understood that lens system 20 may comprise any desired number of lenses. The lens system 20 is surrounded by a coil 22, i.e. an electromagnet, and further surrounded by a magnet 23. By inducing current coil 22, a force may be exerted on lens system 20 to move or deform lenses 21, for example for zooming, i.e. changing the focal length, or focusing (auto focus or manual focus) lens system 20. Furthermore, in an embodiment coil 22 and magnet 23 may serve for suspending lens system 20. In another embodiment, a spring suspension schematically represented by two springs 25 in FIG. 2 may be provided for suspending lens system 20. Through this suspension, lens system 20 is movable, and through sudden accelerations, for example caused by an impact after a fall, may be damaged.

In order to protect lens system 20, in the embodiment of FIG. 2 four pieces 24 of electroactive polymer are arranged around lens system 20. Pieces 24 are, when not activated to be expanded, dimensioned such that lens system 20 is held by the suspension like suspension spring 25 and able to move correspondingly. When activated by applying a corresponding voltage, pieces 24 expand to an expanded state schematically shown in dashed lines and bearing reference numeral 24A such that lens system 20 together with coil 22 is held essentially immobile within magnet 23. Pieces 24 in an embodiment may be controlled by a control circuit evaluating signals from an accelerometer as already explained with reference to FIG. 1.

It should be noted that the illustration of four pieces 24 of electroactive polymer is to be taken merely as an example and any desired number of pieces 24 may be provided, and pieces 24 may be provided in different positions than the one shown. Depending on the exact geometry, different pieces 24 may have different sizes in their non-expanded and/or in their expanded states.

In a single apparatus, more than one movable part may be protected with a protection device like the one shown in FIG. 1. An example for this is shown in FIG. 3.

Figure 3:
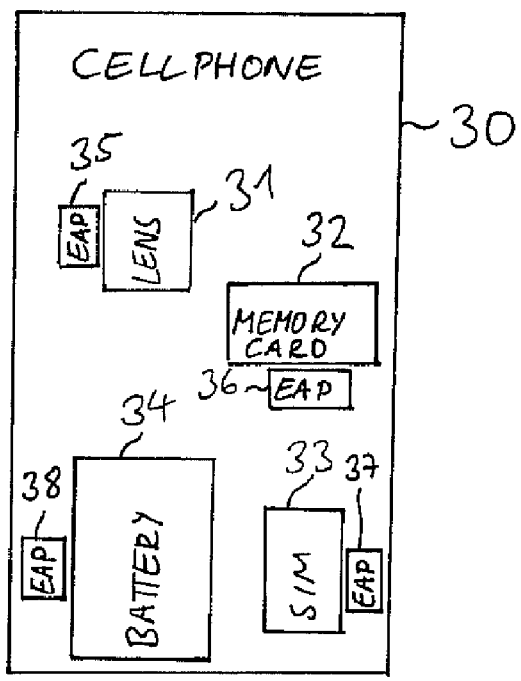
FIG. 3 shows a block diagram of a cell phone according to an embodiment of the present invention.

FIG. 3 shows a cell phone 30 according to an embodiment of the present invention. Cell phone 30 comprises inter alia a removable battery 34, a removable SIM card 33, a removable memory card 32 and a lens arrangement 31 which may comprise movable lenses for zooming or focusing as already explained with reference to FIG. 2. It is to be understood that cell phone 30 may comprise additional components like a display, antenna, communication equipment, loudspeaker, microphone and other components commonly used in conventional cell phones which are not depicted in FIG. 3.

In the embodiment of FIG. 3, each of components 31, 32, 33 and 34 is movable or comprises movable parts which may lead to problems in case of sudden accelerations like an impact after a fall. For example, through such sudden accelerations memory card 32, SIM card 33 and/or battery 34 may be loosened which in turn may temporarily or permanently terminate an electrical connection between the respective components 32, 33, 34 and the remaining circuitry of cell phone 30. This in turn may lead to malfunctions or, in case of battery 34, to a temporary interruption of operation of cell phone 30. Furthermore, as explained with reference to FIG. 2, lens arrangement 31 may be damaged through such sudden or excessive accelerations.

In order to reduce the risk of such inconveniences, one or more protection devices like the one shown in FIG. 1 are used. As shown in FIG. 3, a piece 35 of electroactive polymer is arranged adjacent to lens arrangement 31, a piece 36 of electroactive polymer is arranged adjacent to memory card 32, a piece 37 of electroactive polymer is arranged adjacent to SIM card 33 and a piece 38 of electroactive polymer is arranged to adjacent to battery 34. While one piece 35, 36, 37 and 38 of electroactive polymer is shown adjacent to component 31, 32, 33 and 34, respectively, in FIG. 3, this is to be taken as a schematic representation only, and any desired number of pieces of electroactive polymer may be arranged in any suitable manner adjacent to or inside components 31, 32, 33 and 34 to prevent or reduce movement thereof in a dangerous situation. In the embodiment of FIG. 3, pieces 35, 36, 37 and 38 are controlled by a control circuit based on the signals from an accelerometer as already explained with reference to FIG. 1 (not shown in FIG. 3 for clarity reasons). In an embodiment, a common accelerometer and a common control circuit may be used for all pieces 35, 36, 37 and 38. In a different embodiment, individual accelerometers and/or individual control circuits may be used. In still another embodiment as already explained with reference to FIG. 1 control circuit 11 may be implemented as part of a control circuit used also for other purposes in cell phone 30, for example a control processor generally managing cell phone 30. Furthermore, in an embodiment an accelerometer used coupled to the control circuit may be an accelerometer also used for other purposes, for example for discriminating between landscape and portrait pictures of a camera comprising lens system 31 incorporated in cell phone 30. Irrespective of whether one or more control circuits are used, pieces 35, 36, 37 and 38 may be activated based on the same criteria, for example when a falling motion is detected by the accelerometer and the control circuit, or based on different criteria. For example, different threshold values for acceptable accelerations may be defined for each of pieces 35, 36, 37 and 38, or the same threshold values may be used. It is to be understood that while in cell phone 30 all four components 31, 32, 33 and 34 are protected by a protection device involving the use of an electroactive polymer, in another embodiment, only one or some of these components may be protected, and/or in another embodiment only some of these components may be present in a cell phone.

Similar to the embodiment of FIG. 2, while electroactive polymers are shown in FIG. 3, other electroactive materials may also be used.

Figure 4:
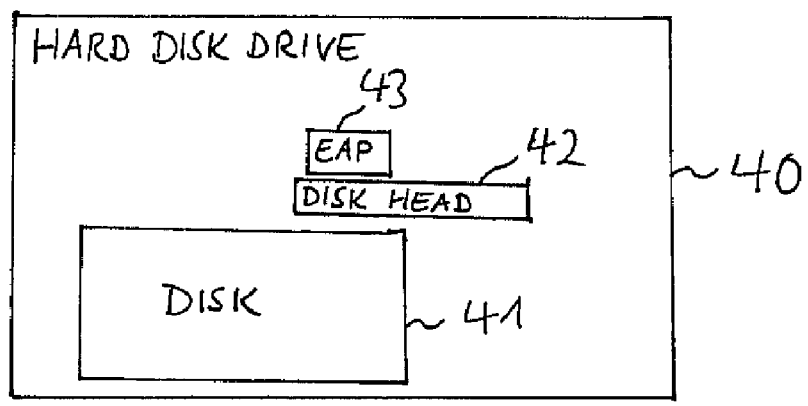
FIG. 4 shows a block diagram of a hard disk drive according to an embodiment of the present invention.

In FIG. 4, a further embodiment of an apparatus incorporating a protection device according to the present inventions schematically depicted. In the embodiment of FIG. 4, the apparatus is a hard disk drive 40 which may be a stand-alone hard disk drive or a hard disk drive incorporated in a further apparatus like a desktop computer, a portable computer, a portable data storage or any other apparatus using hard disks. Hard disk drive 40 comprises a rotating disk arrangement 41 and a movable disk head 42 for reading data from and/or writing data to rotating disk arrangement 41. In case of sudden acceleration like an impact after a fall, disk head 42 without any precautionary measures could "crash" on disk 41 thus destroying data. To reduce the risk of such damage, a protection device similar to the one shown with reference to FIG. 1 is incorporated in hard disk drive 40 of which a piece 43 of electroactive polymer is shown. Piece 43 is intended to represent any suitable number of pieces of electroactive material arranged in a manner to reduce possible movement of disk head 42 when the electroactive material is activated, i.e. brought to its expanded state, by a corresponding voltage signal of a control circuit like control circuit 11 of FIG. 1. Control circuit 11, in turn, generates such voltage signals depending on signals received from an accelerometer like accelerometer 10 of FIG. 1, as already described above. It is to be understood that such a control circuit and accelerometer may be located within hard disk drive 40, but also may be located outside hard disk drive 40 within an apparatus in which hard disk drive 40 is incorporated, like a portable computer.

It is to be noted that the apparatuses discussed with reference to FIGS. 2-4 serve merely as examples for applications of protection devices according to embodiments of the present invention, and protection devices like the one of the embodiment of FIG. 1 may be used in any device where in case of sudden accelerations, falling movements and/or shock the movement of a movable part should be restricted in order to reduce the risk of damage or other inconveniences. Furthermore, as already mentioned, the arrangement of pieces of electroactive polymers or other electroactive materials shown in the drawings is only to be taken as an example, and any desired placement and number of such pieces may be used depending on the movable part involved. Therefore, the embodiments described are taken to be examples only, and the scope of the present invention is intended to be limited only by the appended claims and equivalents thereof.

What is claimed is:

1. An apparatus comprising:
   a movable component;
   at least one piece of electroactive material, the at least one piece of electroactive material being configured to alternately obtain a first state that reduces a potential for displacement of the movable part and a second state that allows displacement of the movable part,
   an accelerometer; and
   a control circuit coupled to the accelerometer and the at least one piece of electroactive material, the control circuit being configured to control the at least one piece of electroactive material to obtain the first state or the second state based on information that the control circuit receives from the accelerator.

2. The apparatus of claim 1, wherein the electroactive material comprises an electroactive polymer.

3. The apparatus of claim 1, wherein the control circuit is configured to activate the electroactive material the information from the accelerometer indicates an adverse state of movement of the device.

4. The apparatus of claim 3, wherein the adverse state of movement comprises at least one of a falling motion or an acceleration that exceeds a predetermined threshold.

5. The apparatus of claim 1, wherein the apparatus comprises at least one of a camera, a hard disk, a computer, or a cell phone.

6. The apparatus of claim 1, wherein the movable component comprises at least one of a chip card, a SIM card, a memory card, a battery, a hard disk head, or a lens arrangement.

7. The apparatus of claim 1, wherein the apparatus comprises:
a plurality of movable components that include the movable component, each of the plurality of the movable components being associated with at least one piece of electroactive material.

* * * * *